United States Patent [19]
Britten

[11] 3,856,450
[45] Dec. 24, 1974

[54] MOLD CONSTRUCTION
[75] Inventor: George C. Britten, Massapequa, N.Y.
[73] Assignee: Manbritt Industries, Inc., Amityville, N.Y.
[22] Filed: Nov. 6, 1972
[21] Appl. No.: 304,193

[52] U.S. Cl. 425/398, 425/DIG. 203, 425/DIG. 214, 425/DIG. 233, 425/DIG. 5, 425/387 B
[51] Int. Cl. .................................. B29d 23/03
[58] Field of Search .......... 425/DIG. 203, DIG. 214, 425/DIG. 233, 383, 387, 387 B, 398, 468, 457, DIG. 5, 408

[56] References Cited
UNITED STATES PATENTS

| | | | |
|---|---|---|---|
| 3,004,285 | 10/1961 | Hagen | 425/DIG. 214 |
| 3,050,773 | 8/1962 | Hagen | 425/DIG. 214 |
| 3,189,422 | 6/1965 | Shea et al. | 425/DIG. 214 |
| 3,198,861 | 8/1965 | Marvel | 425/DIG. 214 |
| 3,555,134 | 1/1971 | Marcus | 264/97 |

Primary Examiner—Richard B. Lazarus
Attorney, Agent, or Firm—Lilling and Siegel

[57] ABSTRACT

A mold including a pair of complementary hollow mold parts defining therebetween a mold cavity, and a plug carried by one of the mold parts for automatic shifting into and out of the cavity upon movement of the mold parts toward and away from each other.

8 Claims, 5 Drawing Figures

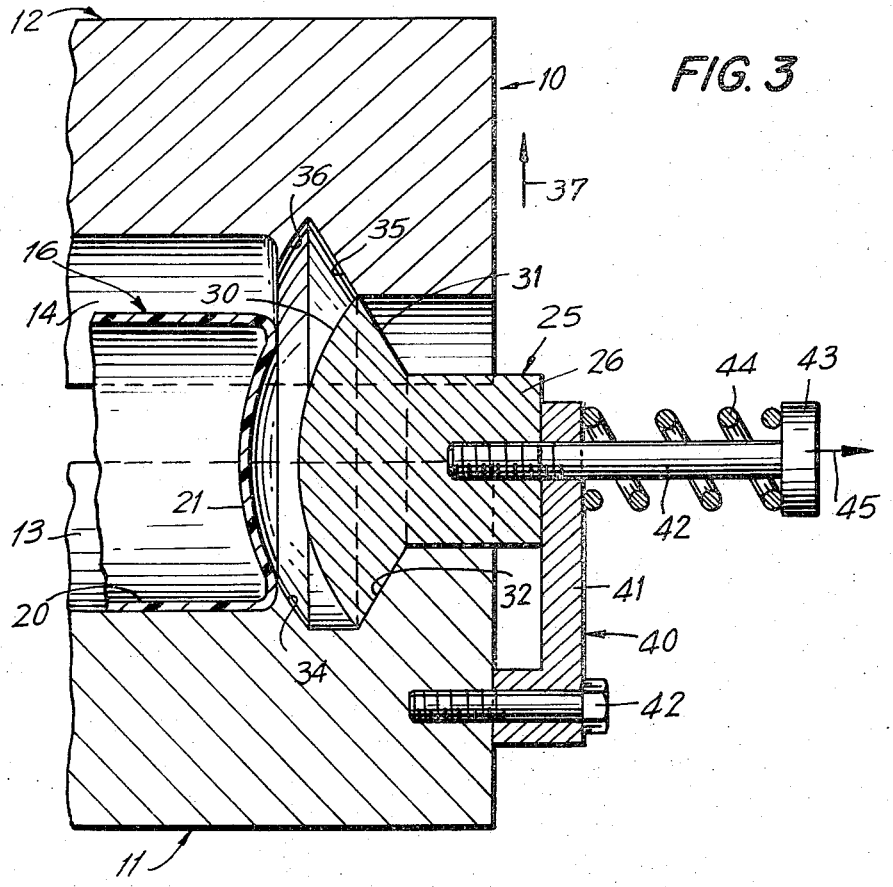
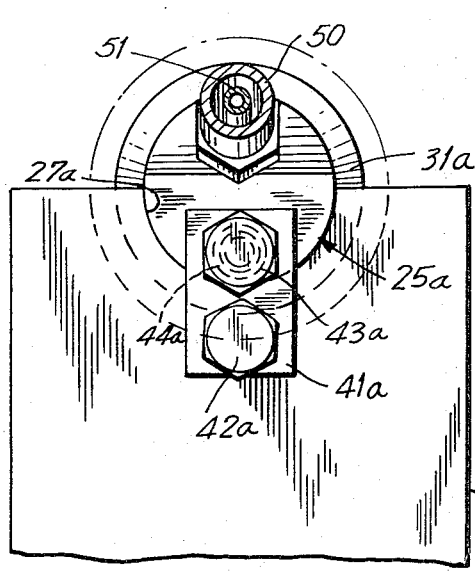
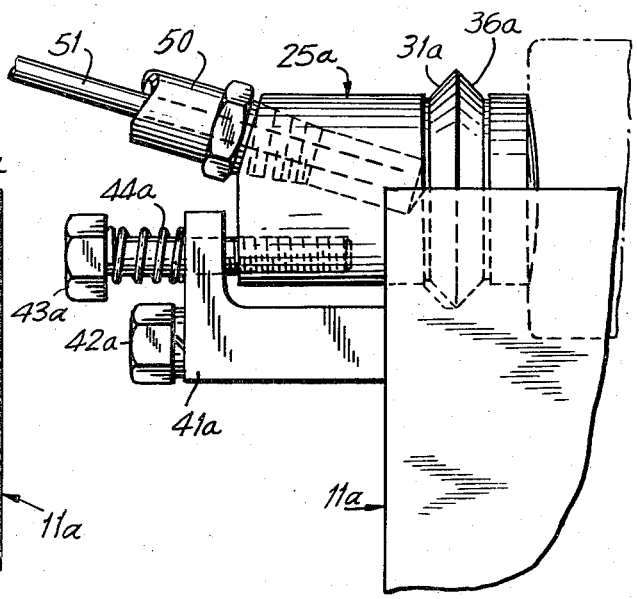

3,856,450

MOLD CONSTRUCTION

BACKGROUND OF THE INVENTION

As is well known to those versed in the art, certain complex configurations of molded articles require multipart molds, say at least three parts, in order to enable the mold parts to be withdrawn from the molded article to release the latter after its formation in the mold cavity. The manufacture of multipart molds, as well as their use in molding operations, is quite expensive, which expense must eventually attach to the articles molded by multipart molds. For this reason, it was not heretofore economically justifiable to produce many types of articles which required multipart molds.

SUMMARY OF THE INVENTION

It is, therefore, an important object of the present invention to produce a unique mold construction which, in one view avoids the need for multipart molds in the manufacture of a wide variety of molded articles heretofore requiring multipart molds.

In another view, the instant invention may be considered as providing a unique mold construction including three or more parts, but wherein the cost of mold manufacture, and operating costs in use of the mold construction are comparable to that of simple, conventional two-part molds.

It is a further object of the present invention to provide a mold construction wherein a pair of mold parts include in one of the mold parts a plug mounted for movement relative to the one mold part upon the movement of the mold parts toward and away from each other all of which occurs automatically to result in a molded article of relatively complex configuration, say having under cuts or recesses, but which are capable of being produced by the instant mold construction in the same manner as are produced molded articles of simple construction without undercuts or recesses.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 3 is a sectional view similar to FIG. 2, but illustrating mold movement or withdrawal upon completion of a molded article.

FIG. 4 is an end view showing a slightly modified form of mold part of the present invention.

FIG. 5 is a partial side elevational view of the embodiment of FIG. 4.

DESCRIPTION OF THE PREFERRED EMBODIMENTS

Figure 2:
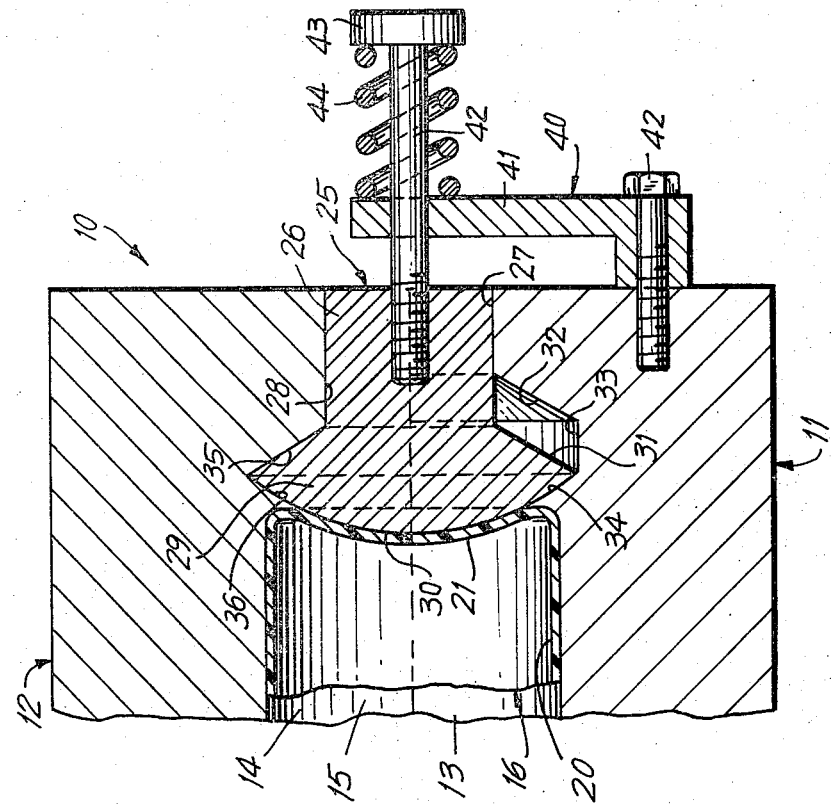
FIG. 2 is a partial sectional view taken generally along the line 2—2 of FIG. 1.
Figure 1:
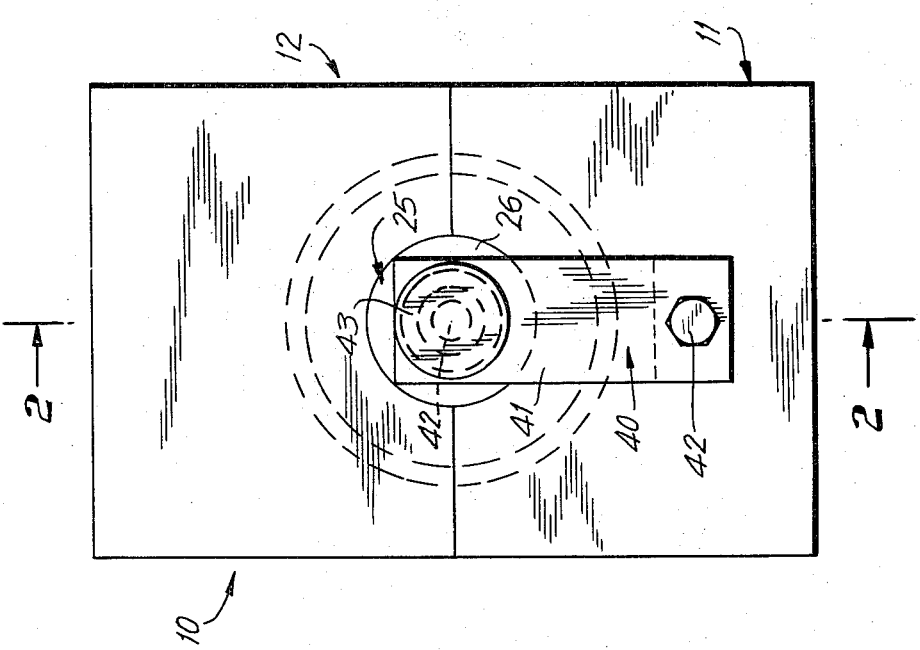
FIG. 1 is an end view in elevation showing the mold part of the present invention in a closed condition of operation.

Referring now more particularly to the drawings, and specifically to FIGS. 1–3 thereof, a mold construction is shown therein and generally designated 10. The mold construction 10 includes a pair of complementary mold parts or halves, as at 11 and 12, being respectively lower and upper mold parts in the illustrated embodiment. The mold parts 11 and 12 are each formed with a hollow or cavity, as at 13 and 14, respectively, which hollows are complementary to each other and combine in their facing relation to define an elongate cylindrical cavity, as at 15, configured essentially as required to produce therein a molded article 16.

While the mold construction of the instant invention has been primarily developed and employed for use in the manufacture of molding of containers, say cylindrical containers for pressurized contents, which are necessarily formed with an end concavity, it is appreciated that the mold construction of the instant invention is capable of many varied applications all of which are intended to be comprehended herein.

The molded articles 16, being illustrated as a hollow, blow molded article, is shown for purposes of illustration and without limiting intent, as having a generally cylindrical peripheral side wall 20, and an end wall 21 of spherical depressed configuration, being internally convex and externally concave.

In the manner shown, or other suitable manner, the hollows 13 and 14 defining the cavity 15 may be generally semicylindrical, or otherwise afforded suitable draft for withdrawal movement away from each other without obstruction by a contained article 16, to release the latter from the cavity.

Further, a plug or auxiliary mold part 25 is carried by one of the mold parts 11, and, as seen in FIG. 2, projects into the cavity 15 through one end thereof. That is, the auxiliary mold part or plug 25, although carried by one of the mold parts 11, is located between or along the meeting faces of the mold parts 11 and 12 for projection into the cavity 15.

More specifically, the cavity end plug or auxiliary mold part 25 may include a generally cylindrical shank 26 extending longitudinally of the elongate cavity 15, and may be coaxial with the cavity, as illustrated. The shank 26 is conformably received in generally semicylindrical formations 27 and 28 provided in respective mold parts 11 and 12, which surfaces combine to define a generally cylindrical passageway entering through the exterior of the mold parts when the latter are closed or moved toward each other. The plug 25 is provided on its inner end with an enlargement or head 29 having on its internal side a convex surface 30, say semispherical, or other suitable convex surface. The enlarged inner end head 29 of the plug 25 is formed on its outwardly facing side with a circle-conical surface 31. As illustrated, the conical surface 31 may intersect about the periphery of head 29 with the spherical surface 30.

From the inner end of the semicylindrical surface 27, the mold part 11 is formed with a frusto-conical surface 32 having its smaller diameter coincident with the inner end of cylindrical surface 27, and having its larger diameter approximately equal to that of the head 29. From the larger diameter of conical mold part surface 32, there extends a semicylindrical surface 33 which terminates at a spherical mold surface 34 complementary to the spherical plug surface 30.

Formed in the mold part 12, extending from the inner end of semicylindrical surface 28 there is formed a semiconical surface 35 having its larger diameter coincident with the larger diameter of a semispherical surface 36 which forms a flush extension of the spherical surface 34.

Thus, as best seen in FIGS. 2 and 3, the semicylindrical surface 28 of mold part 12 extends inwardly beyond the corresponding semicylindrical mold part surface 27 of part 11, so that the semiconical surface 35 of mold part 12 is located longitudinally inwardly of the semiconical surface 32 of mold part 11. The spherical surfaces 34 and 36 of mold parts 11 and 12 are continuous and serve to seat the spherical surface 30 of plug 25 in its inwardly projecting position of FIG. 2.

However, upon separation of the mold parts 11 and 12, or withdrawal thereof from a contained molded article 16, say by upward movement of mold part 12 in the direction of arrow 37 in FIG. 3, the plug 25 is shiftable outwardly, longitudinally of the cavity 15, but transversely of the direction of mold part movement away from each other. In the inwardly projecting position of plug 25, the conical mold surface 35 engages the conical plug surface 31 to maintain the plug inwardly with convex plug surface 30 engaging the concave mold surfaces 34 and 36, and projecting into the cavity 15. In the withdrawn or retracted position of FIG. 3, the plug 25 has been shifted longitudinally outwardly of the cavity 15 to a limiting position with its conical surface 31 in abutting engagement with the mold part conical surface 32. The projecting convex end 30 is thereby withdrawn from the cavity 15 so as not to obstruct or impair removal of the molded article 16.

The plug 25 is mounted for this transverse shifting movement into the cavity 15, to the inward position of FIG. 2 for molding operation, and the outward position of FIG. 3 for release of a molded article, by suitable mounting means 40. The mounting means 40 includes a bracket 41 suitably fixed to one mold part, say mold part 11, as by a fastener 42, and extending therefrom across the line of shifting movement of plug 25. A headed pin or bolt 42 extends slidably through the bracket 41, generally coaxially of the plug 25 and threadedly into the shank 26, to mount the plug for its hereinbefore described shifting movement between the positions of FIGS. 2 and 3.

The outer end of pin 42 is provided with an enlargement or head 43; and, resilient means, say in the form of a coil compression spring 44, may resiliently yieldably urge the plug 25 to its outward or retracted position, in the direction of arrow 45. That is, the coil compression spring 44 may be interposed between the bracket 41 and bolt head 43 to resiliently urge the plug 25 outwardly to the limiting position shown in FIG. 3.

From the position shown in FIG. 3, it will be appreciated that the molded article 16 may be freely removed, without obstruction, from the hollows 13 and 14 of mold parts 11 and 12.

This returns the mold construction 10 to its original position preparatory to closing for the formation of an additional molded article. That is, upon movement of the mold parts 11 and 12 toward each other, the conical plug surface 31 cooperates with the conical mold surface 35 in a camming manner, so that the plug 25 is shifted inwardly against the force of spring 44 to the inwardly projecting position of FIG. 2. That is, by the camming action of at least one of the surfaces 31 or 35, being diagonal to both direction of relative mold movement and the direction of plug movement, the plug is cammed inwardly to its operative position. Of course, opening movement of the mold parts 11 and 12 permits retraction or withdrawal of the plug under the influence of spring 44. Hence, it will be appreciated that the mold parts 11 and 12 may be treated, in operation, as a two-part mold construction, the plug action 25 being entirely automatic upon operation of the mold parts.

Referring now to the embodiment shown in FIG. 4, there is illustrated a mold part 11a, to which is affixed a bracket 41a, as by fastener 42a, a generally cylindrical plug 25a is mounted for shifting movement in a semicylindrical mold surface 27a, as by a guide pin 43a, and is resiliently biased toward a withdrawn or retracted position by resilient means 44a. The plug 25a may be formed with limiting surfaces 31a and 36a cooperating with internal mold surfaces to limit plug shifting movement.

If desired, the plug 25a may be internally hollow and provided with fluid communication means, say in the form of conduits 50 and 51 for conducting fluid through the plug in heat exchange relation therewith. As in the illustrated embodiment, the conduits 50 and 51 may be concentric, or otherwise, as desired, and may conduct cooling water into and out of the plug 25a or other suitable medium.

From the foregoing, it is seen that the present invention provides a mold construction which is relatively simple and inexpensive to manufacture, while serving to produce relatively complex molded articles having external undercuts or recesses, and which is adapted to effect substantial savings in set up and operating time, and consequent costs.

Although the present invention has been described in some detail by way of illustration and example for purposes of clarity of understanding, it is understood that certain changes and modifications may be made within the spirit of the invention.

What is claimed is:

1. A mold construction having a pair of separable complementary hollow mold parts combining to define a cavity for formation therein of a molded article, and wherein said mold parts having draft of unobstructed withdrawal away from each other and a molded article, comprising: a plug carried by one of said mold parts for movement into and out of said cavity for forming an external recess in a molded article when said plug is in its inwardly projecting position in said cavity, resilient means fixed to said one of said mold parts urging said plug toward its outwardly projecting position out of said cavity so as not to obstruct said mold part withdrawal, and cooperating means on said plug and the other of said mold parts to shift said plug to its inwardly projecting position in said cavity against said resilient means upon mold part movement toward each other for forming said recess in a molded article.

2. A mold construction according to claim 1, the hollows of said molded parts being configured to define a generally cylindrical cavity, and said plug being longitudinally movable into and out of an end of said cavity.

3. A mold construction according to claim 2, said plug having a generally convex inner end surface for forming a concave recess in a molded article.

4. A mold construction according to claim 1, said cam means comprising a cam surface, on at least one of said other mold part and plug, diagonal to said withdrawal movement of said other mold part and the direction of movement, and engageable with the other of said mold parts and plug to shift the latter.

5. A mold construction according to claim 4, including an external extension on said plug exteriorly of said mold parts, said resilient means being exteriorly of said one mold part and operatively associated with said extension to effect said plug urgence.

6. A mold construction according to claim 5, in combination with fluid conduit means connected to said plug extension for communication with the interior of said plug to effect heat exchange therewith.

7. A mold construction according to claim 1, said cam means comprising slidably engageable conical surfaces on said plug and other mold part.

8. A mold construction according to claim 7, the hollows of said mold parts being configured to define a generally cylindrical cavity, and said plug having a generally convex inner end surface and being located for movement into and out of an end of said cavity generally concentric with said cavity and said slidably engageable conical surfaces.

* * * * *